UNITED STATES PATENT OFFICE.

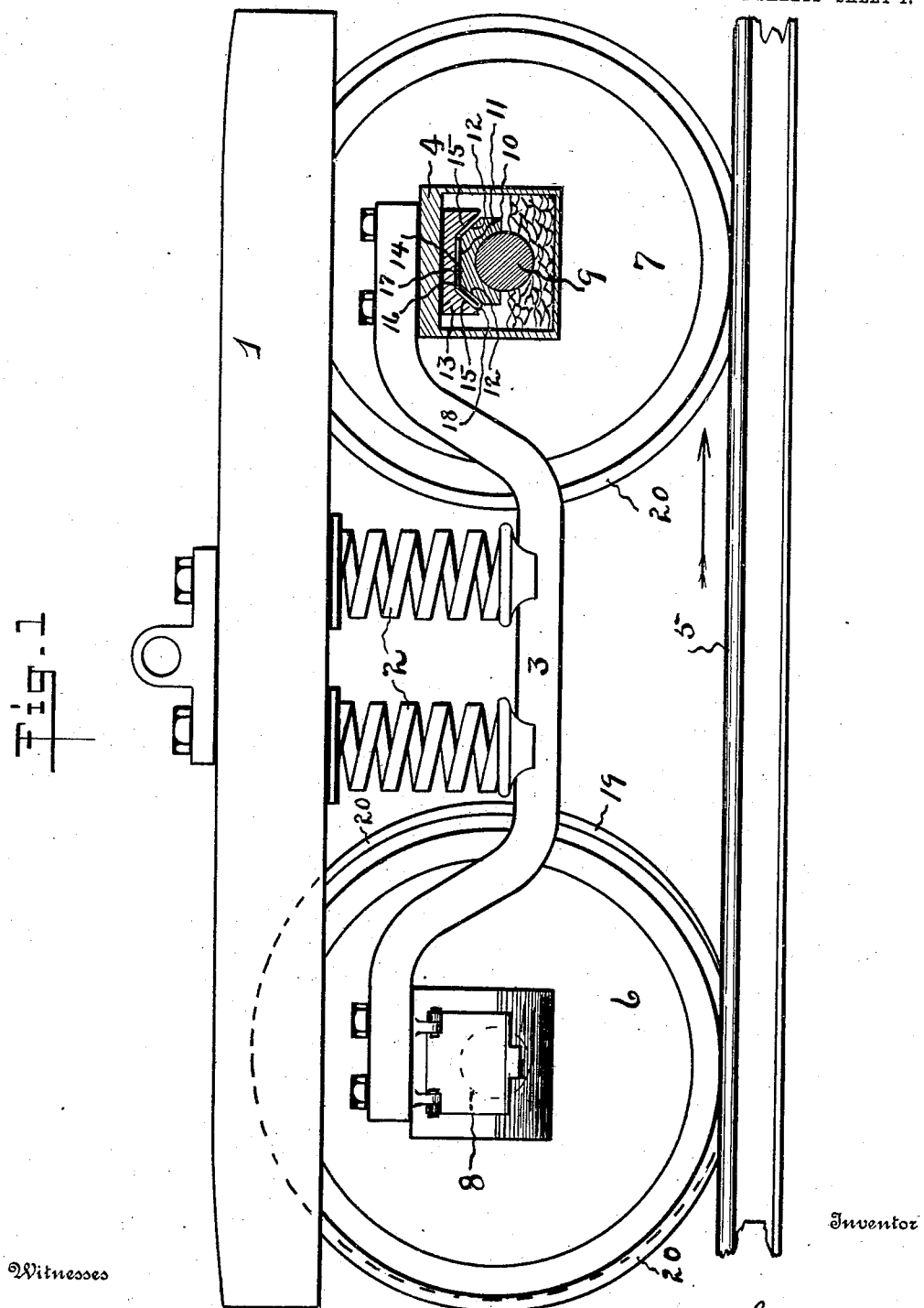

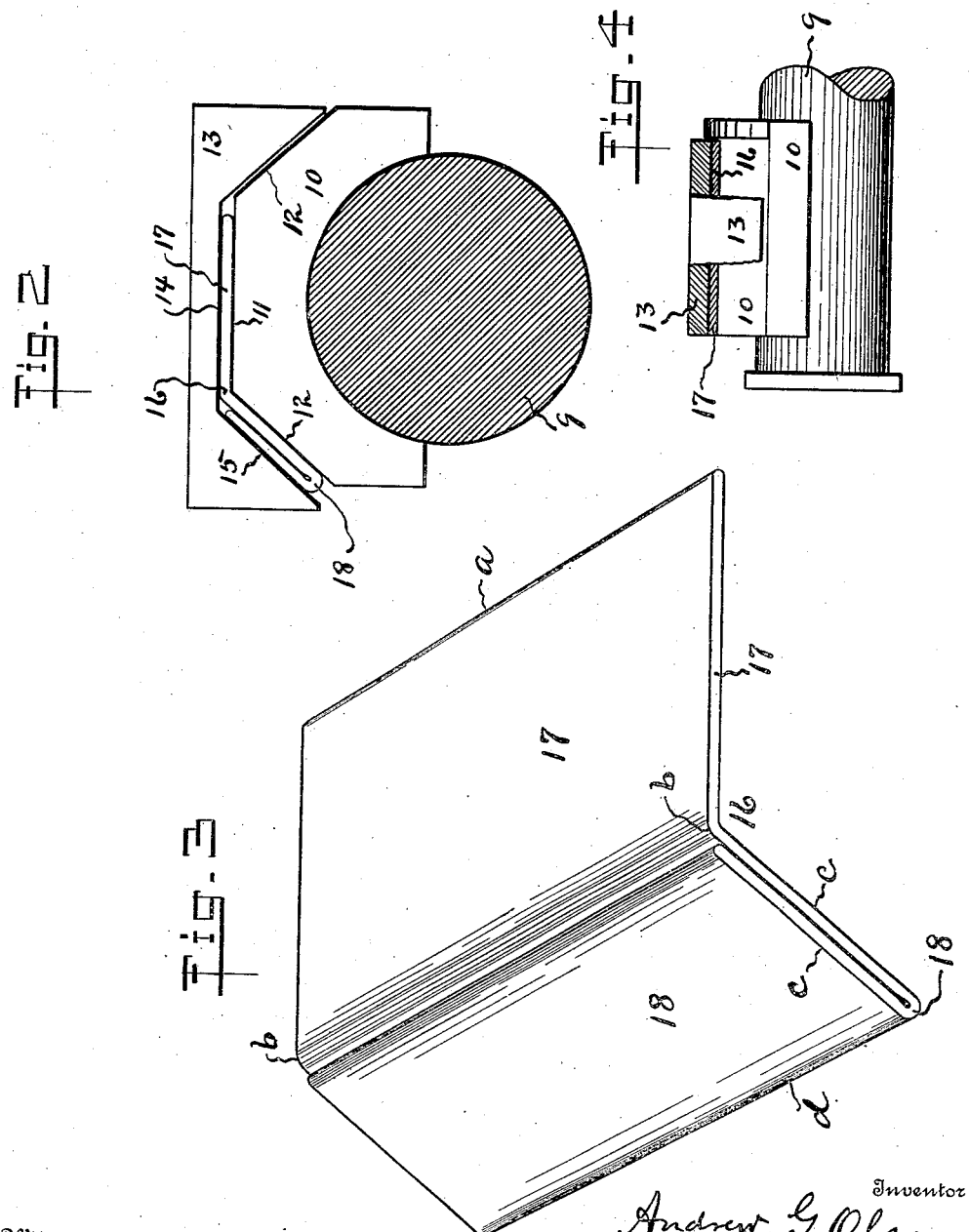

ANDREW G. OLSON, OF COUNCIL BLUFFS, IOWA, ASSIGNOR OF ONE-HALF TO JOHN P. ERVIN, OF OMAHA, NEBRASKA.

ALINING MEANS FOR CAR-WHEELS.

935,924. Specification of Letters Patent. Patented Oct. 5, 1909.

Application filed January 14, 1909. Serial No. 472,264.

*To all whom it may concern:*

Be it known that I, ANDREW G. OLSON, a citizen of the United States, residing at Council Bluffs, in the county of Pottawattamie and State of Iowa, have invented certain new and useful Improvements in Alining Means for Car-Wheels, of which the following is a specification.

This invention relates to improvements in alining means for car wheels for causing the flanges of the several wheels of a railway car truck to be disposed parallel, to prevent cutting of the flanges.

While the wheels and wheel flanges of a railway car are disposed at a right angle to the axle, the wheels being constructed rigid with the axle, the axle itself is not always disposed at a right angle to the longitudinal lines of the car or car truck, thereby resulting in a faulty presentation of the wheel flange to the car track or rails, and causing a cutting of the wheel flanges upon the rails, when the car is in motion.

The invention has reference to the use of an alining-member or plate which may be conveniently interposed between the axle-brass and the adjacent saddle, and so formed that it will cause the car wheel to present itself parallel with the rail, or in other words will cause the car axle to be presented at a right angle with the longitudinal lines of the car and car truck.

With these objects in view the invention presents a novel combination and arrangement of parts, as described herein, pointed out by the appended claims, and as illustrated in the accompanying drawing, wherein,—

Figure 1 is a vertical, side view of a car truck, showing the lubricating box, car axle, a brass and saddle in section, with an alining plate operatively mounted thereon, and embodying my invention. Fig. 2 is an end view of parts, showing the alining-plate operatively mounted between the saddle and brass, the car axle being in section. Fig. 3 is a perspective view of the alining plate. Fig. 4 is a view showing a terminal of the axle, the brass thereon, a saddle partly in section, and the alining plate in section, this being a side view of parts.

Referring now to the drawing for a more particular description, numeral 1 indicates the platform of a railway car truck having springs 2, the lower ends of which rest upon yokes or bearing bars 3, the ends of the yokes resting upon housings 4 upon which the lubricating boxes are supported.

At 5 is shown a car track or rail, with car wheels 6 and 7 resting thereon, said wheels being mounted, respectively upon axles 8 and 9. The flanges of the car wheels are indicated at 20. Upon the axles are removably seated brasses, their upper edges having the horizontal facet 11 and transversely inclined facets 12. Saddles 13 are formed with the horizontal facet 14 upon its under surface and the transversely and downwardly inclined facets 15; and as thus described the weight of the car rests upon the car axles, pressure from this weight being communicated to brasses 10 from saddles 13; and surfaces 14 and 15 of the saddle are normally in contact with the respective surfaces 11 and 12 of brass 10.
In operating railways, the great damage done by the cutting of car wheels from contact with the car rail, is well known. At the time the axles are mounted they are generally parallel, but from shocks, vibrations and stresses they may be displaced so that the peripheral flanges of the wheels upon one or both of the axles will not be parallel with the track rails, and thereafter, when the car is in motion, the frictional contact of the rail upon the tread of the wheel will cause a grinding or cutting of the wheel flange. To overcome these objectionable features and to provide a convenient means of adjustment whereby one end of the car axle may be forced in a rearward or forward direction, and thereby will cause the peripheral wheel-flanges to be parallel with the track rail, I provide an alining-member 16; this consists of a plate, liner or wedge, preferably of metal, and has a supporting part or leaf 17 and an adjusting part or leaf 18, the adjusting part having a thickness greater than that of the supporting part. The device is preferably constructed integral, although this is not necessary, and when not integral they are hinged or suitably connected at their edges; also leaves 17 and 18 preferably have their respective walls of uniform thickness throughout their length, but this is immaterial.

In Fig. 1, at one end of the truck, wheels 6 and 19 are shown mounted upon axle 8, wheel 19 being out of alinement. It will be understood that railway car wheels are mounted upon their axles so that peripheral flanges 20 are disposed at a right angle to the axles, and the illustration is introduced to show wheel 19 out of alinement with the track and truck, axle 8 not being parallel with axle 9.

In operation, when it is discovered that the flange of a wheel is being cut from a faulty contact with the rail, the saddle may be raised from the brass, by well known means, and after it has been elevated, the alining plate 16 may be manually placed therebetween, leaf 18 engaging between one of inclined faces 12 and 15, and, as is apparent, leaf 18 may occupy a position between either of the inclined facets forwardly or rearwardly of the car truck, according to the adjustment required, and after saddle 13 is seated upon the device, the weight of the car rests thereon, and the end of the axle adjacent the device will be forced in a direction opposite the thicker leaf 18, whereby an adjustment is made, as desired.

As illustrated in Fig. 1, if it is desired to move the visible end of axle 9 forwardly or in the direction indicated by the arrow, so that it may be maintained at a right angle to the truck, leaf 18 of alining-member 16 is disposed between that pair of facets 12 and 15, rearward of said axle. Alining-plates 16 may be constructed of different thicknesses, to force the axle, or the end thereof, to greater or lesser distances as may be required.

As above stated, it is preferred that leaves 17 and 18 be cast integral. When thus constructed or joined, they describe an obtuse angle, in cross section, and when leaf 17 is disposed horizontally, leaf 18 has an inclination corresponding with the inclined surfaces 15 and 12 of the saddle and brass, and, when operatively seated, leaf 18 will be prevented from sliding downward, since it is held by supporting leaf 17.

The device as described, is inexpensive in construction; it may have various degrees of thickness, of a form corresponding to the angular surfaces or facets of the brass and saddle.

I have found it convenient in manufacture to form the alining-member, best shown in Fig. 3, of a rectangular plate *a*, bent transversely at *b*, at about one-third its length, to form the supporting wing or leaf 17 and to form the portion *c*, the part *c* of the plate being bent transversely at about its middle *d* and folded, to provide the adjusting leaf 18 having substantially twice the thickness of leaf 17, leaves 17 and 18, in cross section, thereby presenting an angle conforming to the horizontal and one pair of inclined facets 12 and 15 of the brass and saddle, between which facets it may be seated.

Having fully described my invention, what I claim and desire to secure by Letters Patent is,—

1. The combination with the axle-brass and saddle, said brass and saddle having oppositely-disposed, horizontal facets and oppositely-disposed, transversely-inclined, longitudinal facets, of an alining member comprising a connected supporting-leaf and adjusting-leaf, said supporting-leaf adapted to have a seating between the horizontal facets, said adjusting-leaf having a thickness greater than the supporting-leaf and adapted to have a seating between the transversely-inclined, longitudinal facets of said brass and saddle.

2. In combination with the axle-brass and saddle, said brass and saddle having oppositely-disposed, horizontal facets and oppositely-disposed, transversely inclined, longitudinal facets, an alining device for the purpose described, comprising a plate bent to form in inclined relation a supporting-portion and an integral adjusting-portion, said adjusting-portion having a greater thickness than the supporting-portion; said supporting-portion adapted to have a seating between the horizontal facets, with the adjusting-portion intermediate the transversely inclined, longitudinal facets of said brass and saddle.

3. In combination with the axle-brass and saddle, said axle-brass and saddle having oppositely-disposed horizontal facets and oppositely-disposed, transversely-inclined facets; a device for the purpose described, comprising a metallic liner bent transversely to form an adjusting portion and to form a supporting portion having a less thickness than the adjusting portion; the supporting portion of said liner adapted to have a seating between said horizontal facets; said adjusting portion of the liner adapted to have a seating between the transversely inclined facets of said axle-brass and saddle.

In testimony whereof I have affixed my signature in presence of two witnesses.

ANDREW G. OLSON.

Witnesses:
 HIRAM A. STURGES,
 HARRY THOMPSON.